C. S. McCARTHY, Jr.
CULTIVATOR.
APPLICATION FILED DEC. 6, 1919.

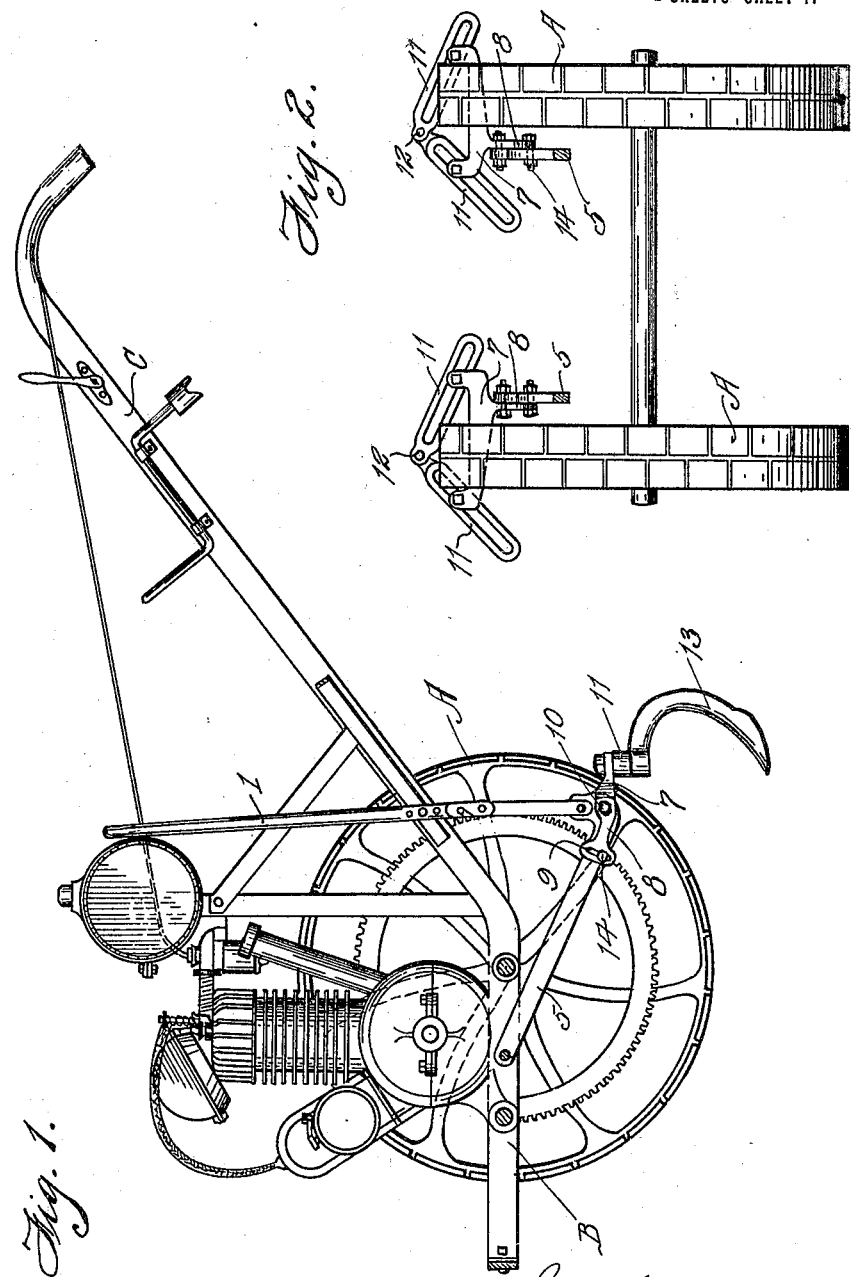

1,399,021.

Patented Dec. 6, 1921.
2 SHEETS—SHEET 2.

UNITED STATES PATENT OFFICE.

CHARLES S. McCARTHY, JR., OF SANDUSKY, OHIO, ASSIGNOR, BY MESNE ASSIGNMENTS, TO THE MOTOR MACULTIVATOR COMPANY, OF TOLEDO, OHIO, A CORPORATION OF OHIO.

CULTIVATOR.

1,399,021.  Specification of Letters Patent.  Patented Dec. 6, 1921.

Application filed December 6, 1919. Serial No. 343,089.

*To all whom it may concern:*

Be it known that I, CHARLES S. Mc-CARTHY, Jr., a citizen of the United States, residing at Sandusky, in the county of Erie and State of Ohio, have invented certain new and useful Improvements in Cultivators, of which the following is a specification.

The present invention appertains to agricultural implements and particularly embodies new and useful improvements in cultivators. It is known that cultivators of both the hand and motor driven type, as used today, are commonly employed for the cultivation of many different kinds of plant growths. Necessarily, the earth working devices or tools utilized for these implements are of different types according to the character of the growth being cultivated. The character of the soil or earth operated upon also controls somewhat in the latter connection, and an essential desideratum in the art is to have the tools not only interchangeable but adaptable to many and various requirements regarding adjustment by which to enable them to cultivate as closely as possible to the plants without injury to or uprooting the same.

With the foregoing in mind, I have developed a special form of tool holder carrying forward the invention embodied in my co-pending application Serial #266,646, filed December 13, 1918, so that a wide range of adjustment of the earth working devices may be obtained both respecting individual and collective positioning of the same relative to one another and in relation to their mounting on the implement. Additionally I have provided for a peculiar adjustability of the tools to accommodate for variation in their vertical pitch, a feature not only advantageous in facilitating the use of the implement by persons of different height, but to enable the tools to perform their functions under different conditions of service.

Another object had in view by me in developing my improvements has been to insure a construction of supporting means for the tool holding means such that the tools will be disposed as near to the points of traction of the implement as possible, thereby reducing to a minimum the extent of lateral shifting of the tools incident to sidewise movement of the handles of the cultivator. I have also connected the tool holding means with the frame of the cultivator in such a manner as to practically entirely relieve the operator of any load as he guides the machine from the handles during its progress.

In the accompanying drawings, in which similar characters refer to similar parts throughout, as identified in the specification of details found hereinafter, Figure 1 is a sectional view of a motor cultivator embodying the essential features of the invention.

Fig. 2 is a plan view and with parts in section to bring out more clearly the relative arrangement of the traction wheels and tool holding means.

Figure 4:
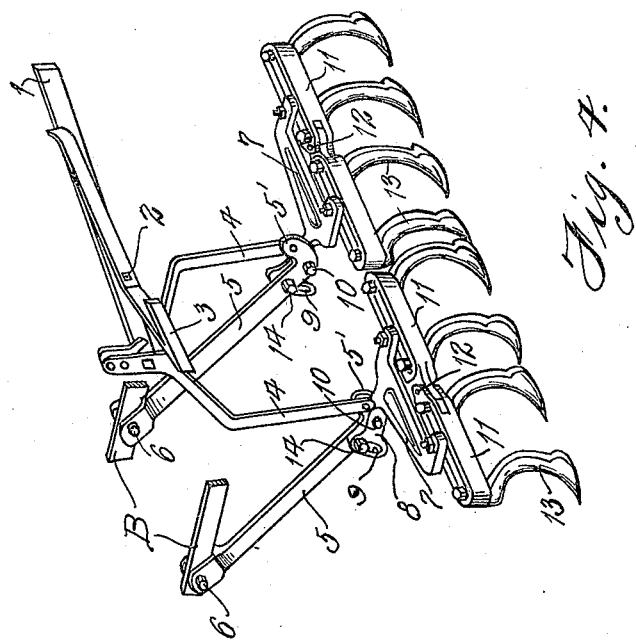
Fig. 4 is a perspective view showing more particularly the tool holding devices and the raising and lowering means for the same.

I do not deem it necessary to describe with any detail the construction of the cultivator to which my invention is applied because obviously the implement may be one of many different types at present in use. It suffices to state that the implement illustrated may or may not be a motor operated type and includes primarily the ground wheels A, the supporting frame B and the handles C. The implement is equipped with tool raising and lowering means of the class presented in my co-pending application above identified, but any equivalent means may be utilized or not within the purview of my present improvements. The raising and lowering means will not be described as to operation, this being immaterial to the invention. The said means include an operating lever 1, pivotally supported at 2 upon a suitable bracket 3. The lever 1 is connected with and adapted to raise and lower a yoke 4 to the lower ends of the sides of which are pivotally attached to connecting bars, or pulling bars 5.

The bars 5 each forming a part of a tool holding unit, are connected at their upper ends, at 6 with the frame B and each bar is formed at its lower rear end with a vertical extension 5′ having an aperture therein through which passes a pivot connecting the bar with the adjacent side of the yoke 4. Also mounted at the lower rear end of each bar 5 is a bracket 7 of somewhat U-form provided with a forwardly extending arm 8. The arm 8 is formed with a vertical slot 9 at its front extremity and the bracket 7 is pivotally connected with the lower rear end of the bar 5 as shown at 10.

Each bracket 7 has a suitable fastening at the rear extremity of each side thereof whereby the bracket is connected with the tool support proper, the latter comprising a pair of supporting members 11 slotted longitudinally and pivotally connected together at their adjacent ends, as shown at 12. The supporting members 11 are illustrated as each carrying two tools or earth working devices in the form of shovels 13. Obviously, however, one or a greater number of tools within the reasonable capacity of each member 11 may be employed. Likewise, it will be apparent from Figs. 2 and 3 in the drawings that an extremely wide range of adjustment of the members 11, relatively to each other, and relatively to the corresponding members of the opposing pair, when a plurality of pairs is being used, may be obtained. In respect to the members of each pair forming a part of each tool holding unit, it is notable that they may not only be shifted laterally and bodily in opposite direction and properly adjusted at any point in such movement, but the members are susceptible of many different adjustments in angular relation to one another. On top of these adjustments of the tool supporting members themselves, it is evident that a considerable additional adjustment for the tools may be secured by reason of the shiftability of the points of attachment of the latter in the slots of each of the members 11. Practically all ordinary conditions met with in cultivating plants of different kinds are provided for by the adjustability of the parts 11 relative to one another and in respect to the mode of supporting same from the connecting or pulling bars 5. The adjustment of the tools 13 for variation in their vertical pitch is, of course, obtained by the pivotal connection 10 and the use of a fastening 14 passing through the slot 9 at the front end of the arm 8 of the bracket 7. It is clear that a rocking of the brackets 7 on their points of pivotal support 10 enables a suitable amount of variation in pitch of the tools 13, in conjunction with the parts 8, 9, and 14.

Figure 3:
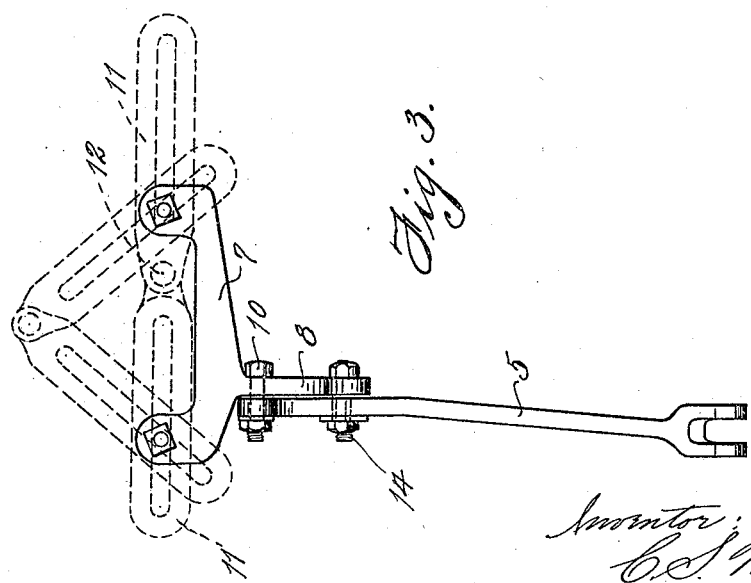
Fig. 3 is a plan view of the tool holding unit, dotted lines showing different adjustments of the tool supporting members.

The adjustment of the members 11, as illustrated in Fig. 2 and as depicted in Fig. 3 in dotted lines, affords a staggering arrangement for the tools or earth working devices when positioned thereon.

Having thus described my invention what I claim as new is:

1. In a cultivator, the combination with a frame and drag bar, of a transversely disposed supporting bracket carried by the drag bar and having two spaced points of connection, tool supporting members having adjacent ends thereof pivotally connected to each other so that they can be swung into different angular positions, and pivot bolts at the two points of connection of the transverse bracket, said pivot bolts being adapted to engage the respective tool supporting members at different points in the length thereof, depending upon the angular relation and position of the tool supporting members, thereby enabling the tool supporting members to be secured in position in different angular relations to themselves as well as in different angular relations to the supporting bracket.

2. In a cultivator, the combination with a frame and drag bar, of a pair of substantially horizontally disposed tool holding bars which are pivotally connected to each other at their adjacent ends and are adapted to be swung into different angular positions, and a supporting bracket having two points of connection which have a pivotal and sliding connection with the respective bars.

3. In a cultivator, the combination with a frame and drag bar, of a pair of substantially horizontally disposed tool holding bars which are pivotally connected to each other at their adjacent ends so as to be swung into different angular positions relative to each other, a transverse supporting bracket having two points of connection which have both a sliding and pivotal connection with the respective bars, and means for adjustably connecting the bracket to the drag bar whereby it can be swung about a horizontal axis and adjusted to different angular positions thereon.

4. In a cultivator, the combination with a frame and drag bar, of a pair of substantially horizontally disposed tool holding bars which are slotted longitudinally and have the adjacent ends thereof pivotally connected, a supporting bracket carried by the drag bar and having two points of connection, and clamping bolts connecting the supporting bracket at its points of connection to the respective bars and adjustably received within the slots thereof, said slots also providing a means for attaching the tools to the bars.

5. In a cultivator, the combination with a frame and drag bar, of a pair of substantially horizontally disposed tool holding bars which are slotted longitudinally and have the ends thereof pivotally connected so that the bars can be adjusted into different angular relations, a supporting bracket adjustably mounted upon the drag bar and having two points of connection, said supporting bar being adapted to be locked in different angular positions thereon, and a pair of clamping bolts connecting the supporting bracket at its two points of connection to the respective bars and adjustably received within the slots thereof, said slots also providing a means for attaching the tools to the bars.

6. In a cultivator, the combination with a frame and drag bar, of a transversely disposed supporting bracket carried by the drag bar and having two spaced points of connection, a pair of substantially horizontally disposed tool holding bars which are pivotally connected to each other at their adjacent ends and are adapted to be swung into different angular positions, and fastening bolts at the two points of connection of the supporting bracket, said fastening bolts being adapted to engage the respective tool holding bars at different points in the lengths of the bars so that the bars can be clamped in position in different angular relations to each other and to the supporting bracket.

7. In a cultivator, the combination with a frame and drag bar, of a transverse supporting bracket carried by the drag bar and having two spaced points of connection, tool supporting bars having adjacent ends thereof pivotally connected to each other so that they can be swung into different angular positions, and pivot bolts at the two points of connection of the bracket, said pivot bolts having both a pivotal and sliding connection with the tool supporting bars whereby the latter can be secured in position at different angles to each other and to the supporting bracket.

8. In a cultivator, the combination with a frame and drag bar, of a transverse supporting bracket carried by the drag bar and mounted to be swung about a horizontal axis into different angular positions, said supporting bracket having two spaced points of connection, a pair of substantially horizontally disposed tool holding bars pivotally connected to each other at their adjacent ends, and pivot bolts at the two points of connection of the transverse bracket, said pivot bolts having both a pivotal and sliding connection with the respective tool supporting members whereby the latter can be secured in position at different angles to themselves and to the supporting bracket.

In testimony whereof I affix my signature.

CHARLES S. McCARTHY, Jr.